US009083255B2

(12) United States Patent
Duan et al.

(10) Patent No.: US 9,083,255 B2
(45) Date of Patent: Jul. 14, 2015

(54) ADAPTIVE DEAD TIME CONTROL SCHEME FOR SWITCH MODE POWER CONVERTER WITH SYNCHRONOUS RECTIFIERS TOPOLOGY

(71) Applicant: Analog Devices, Inc., Norwood, MA (US)

(72) Inventors: Jun Duan, Shanghai (CN); Huailiang Sheng, Shanghai (CN); Renjian Xie, Shenzhen (CN); Bo Yuan, Xi'an (CN); Jerry Zhai, San Jose, CA (US)

(73) Assignee: Analog Devices, Inc., Norwood, MA (US)

( * ) Notice: Subject to any disclaimer, the term of this patent is extended or adjusted under 35 U.S.C. 154(b) by 229 days.

(21) Appl. No.: 13/680,736

(22) Filed: Nov. 19, 2012

(65) Prior Publication Data
US 2014/0140106 A1    May 22, 2014

(51) Int. Cl.
*H02M 3/335* (2006.01)
*H02M 1/38* (2007.01)

(52) U.S. Cl.
CPC ............ *H02M 3/33592* (2013.01); *H02M 1/38* (2013.01); *Y02B 70/1475* (2013.01)

(58) Field of Classification Search
CPC ..................... H02M 3/33592; H02M 3/33553; H02M 3/33538
USPC ......................................... 363/17, 127, 21.06
See application file for complete search history.

(56) References Cited

U.S. PATENT DOCUMENTS

| | | | |
|---|---|---|---|
| 7,262,980 B2* | 8/2007 | Phadke et al. | 363/89 |
| 7,499,299 B2* | 3/2009 | Phadke et al. | 363/89 |
| 2011/0194206 A1* | 8/2011 | Sase et al. | 360/75 |

OTHER PUBLICATIONS

"Fast Synchronous-Buck MOSFET Drivers With Dead-Time Control", TPS2832, TPS2833, Texas Instruments, SLVS195C, Feb. 1999—Revised Jan. 2001, pp. 1-16.

* cited by examiner

*Primary Examiner* — Harry Behm
(74) *Attorney, Agent, or Firm* — Schwegman Lundberg & Woessner, P.A.

(57) ABSTRACT

An adaptive dead time (ADT) control scheme for use with a switch mode power converter having a full bridge with synchronous rectifiers topology. A controller which implements the control scheme includes an input circuit arranged to receive a signal representative of the converter's output voltage, and an output circuit arranged to operate the converter's switching elements and synchronous rectifiers to produce a desired output voltage. The controller is further arranged such that the converter's "dead time" is adaptively varied in an inverse relationship to the magnitude of the load current. In a preferred embodiment, the signals used to operate the synchronous rectifiers are PWM signals, and the controller adaptively varies the dead time in a linear inverse relationship to the magnitude of the load current by modulating the rising and falling edges of the signals used to operate the synchronous rectifiers.

20 Claims, 8 Drawing Sheets

ADAPTIVE DEAD TIME CONTROL SCHEME FOR SWITCH MODE POWER CONVERTER WITH SYNCHRONOUS RECTIFIERS TOPOLOGY

BACKGROUND OF THE INVENTION

1. Field of the Invention

This invention relates generally to switch mode power converters, and more particularly to control schemes for operating a switch mode power converter with a full bridge with synchronous rectifiers topology.

2. Description of the Related Art

Figure 1A:
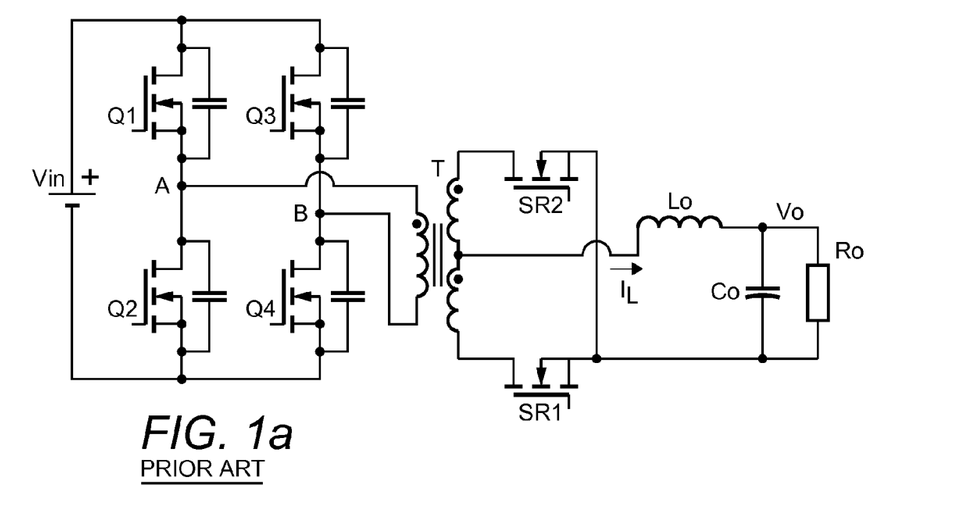
FIG. 1a is a schematic diagram of a known full bridge power converter with SR topology.

A power converter with a full bridge with synchronous rectifiers (SR) topology is shown in FIG. 1a. Such converters are often used in high power applications such as telecom, networking, servers, etc., in which the converter receives a DC input voltage typically in the range of 36-72 volts. In the exemplary embodiment shown, four transistors Q1-Q4 are arranged in a full bridge configuration, with the bridge's input connected across a DC input voltage Vin and its output—taken at circuit nodes A and B—connected across the primary winding of a transformer T. First and second synchronous rectifiers SR1 and SR2 are coupled between the secondary side of transformer T and an output circuit, which includes an output inductor Lo and capacitor Co and which provides an output voltage Vo suitable for driving a load Ro. Q1-Q4 and SR1 and SR2 are typically implemented with MOSFETs, though other devices might also be used.

Figure 1B:
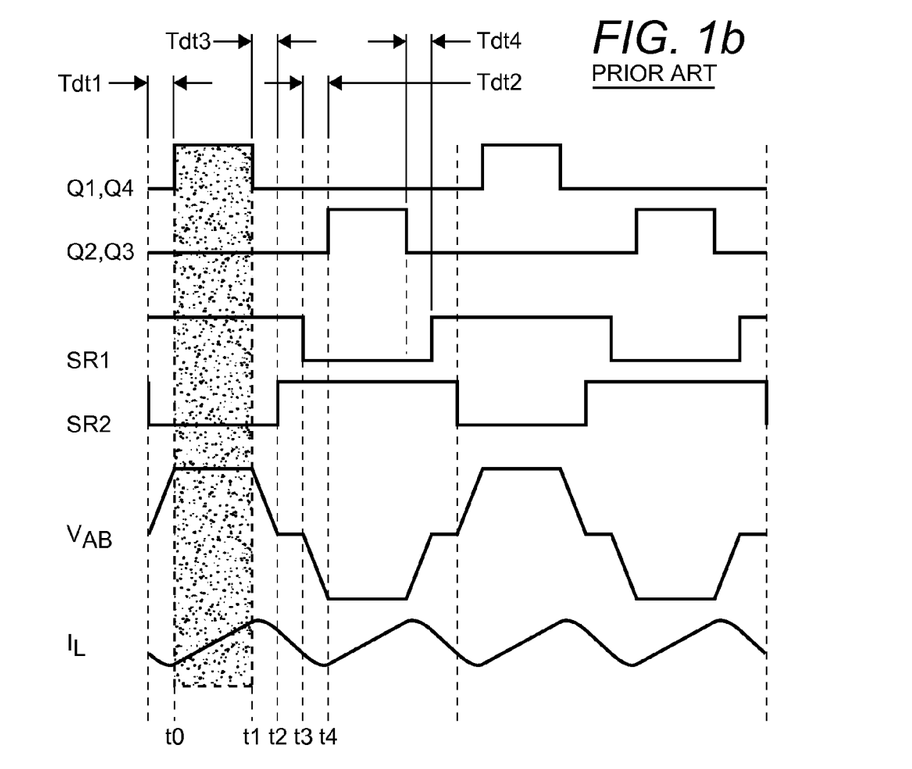

Normal operation of the full bridge converter is illustrated in FIG. 1b. Transistors Q1, Q4 and Q2, Q3 are alternately turned on and off to apply an AC voltage ($V_{AB}$) across the primary side of transformer T. SR1 and SR2 are also turned on and off alternately to control the current $I_L$ in inductor Lo. When operated in continuous conduction mode (CCM), SR1 and SR2 periodically overlap, such as between times t2 and t3; this has the effect of shorting the secondary winding, and thereby forcing $V_{AB}$ to zero.

A full bridge converter of this sort has associated "dead time" (Tdt) values, defined as follows: 1) the time between the falling edge of SR2 and the rising edge of Q1,Q4 (Tdt1); 2) time between the falling edge of SR1 and the rising edge of Q2,Q3 (Tdt2); 3) the time the falling edge of Q1,Q4 and the rising edge of SR2 (Tdt3); and 4) the time between the edge of Q2,Q3 and the rising edge of SR1 (Tdt4). To achieve the highest efficiency at full the converter is typically arranged to have a short, fixed dead time. However, a light load the rate of change for primary side voltage $V_{AB}$, such that a short dead time can result in $V_{AB}$ being shorted by SR1 and SR2 or prematurely forced to ±Vin before it reaches zero or Vin normally. This would induce a large current in the circuitry, which causes power loss and loss of efficiency at light loads. This may be unacceptable when there is a requirement that a supply meet a certain efficiency specification all across its load range, rather than just at a single load point.

SUMMARY OF THE INVENTION

An adaptive dead time (ADT) control scheme for a full bridge power converter with SR topology is presented, which achieves high efficiency under varying load conditions.

The present ADT control scheme is preferably implemented with a controller, which is intended for use with a switch mode power converter which includes a transformer, a full bridge circuit comprising a plurality of switching elements and coupled to a DC input voltage Vin at an input and to the primary side of said transformer at an output, and first and second synchronous rectifiers coupled between the secondary side of the transformer and an output circuit which includes an output inductor and is arranged to provide an output voltage to which a load may be coupled. The controller includes an input circuit arranged to receive a signal representative of the converter's output voltage, and an output circuit arranged to provide signals which operate the converter's switching elements and synchronous rectifiers to produce a desired output voltage. The controller is further arranged such that the converter's "dead time" is adaptively varied in an inverse relationship to the magnitude of the load current preferred embodiment, the signals used to operate the synchronous rectifiers are pulse-width modulated (PWM) signals, and the controller is arranged to adaptively vary the dead time in a linear inverse relationship to the magnitude of the load current by modulating the rising and falling edges of the signals used to operate the synchronous rectifiers. The controller is preferably arranged such that the switch mode power converter operates in continuous conduction mode (CCM).

These and other features, aspects, and advantages of the present invention will become better understood with reference to the following drawings, description, and claims.

BRIEF DESCRIPTION OF THE DRAWINGS

FIG. 1b is a timing diagram illustrating the operation of the known power converter of FIG. 1a.

DETAILED DESCRIPTION OF THE INVENTION

The operation of a power converter with a full bridge with SR topology is illustrated FIGS. 2a, 3a, 4a and 5a, along with corresponding timing diagrams 2b, 3b, 4b and 5b, respectively; in this example, the converter is arranged to operate in continuous conduction mode (CCM). Note that FIGS. 2a-5a only indicate one of the four "dead time" intervals as defined above. The basic converter topology is as described above: four transistors Q1-Q4 are arranged in a full bridge configuration, with the bridge's input connected across a DC input voltage Vin and the bridge's output—taken at circuit nodes A and B—connected across the primary winding of transformer T. Synchronous rectifiers SR1 and SR2 are connected respective sides of the transformer's secondary winding and a first node (labeled as node 4 in FIG. 2a), and inductor Lo is connected between a tap on the transformer's secondary winding and an output node at which output voltage Vo is provided. Output capacitor Co and load Ro are connected between the output node and the first node.

Figure 2A:
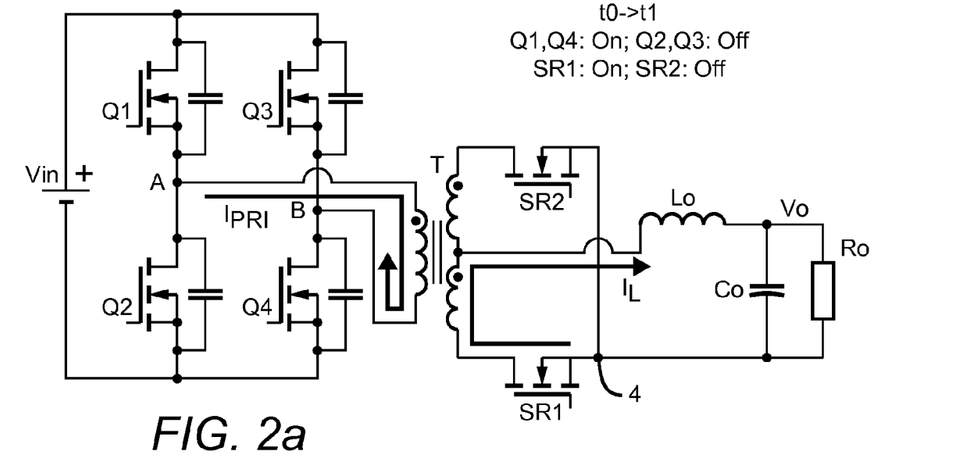
FIGS. 2a and 2b are schematic and timing diagrams, respectively, illustrating the operation of a full bridge power converter during a first time interval.
Figure 2B:
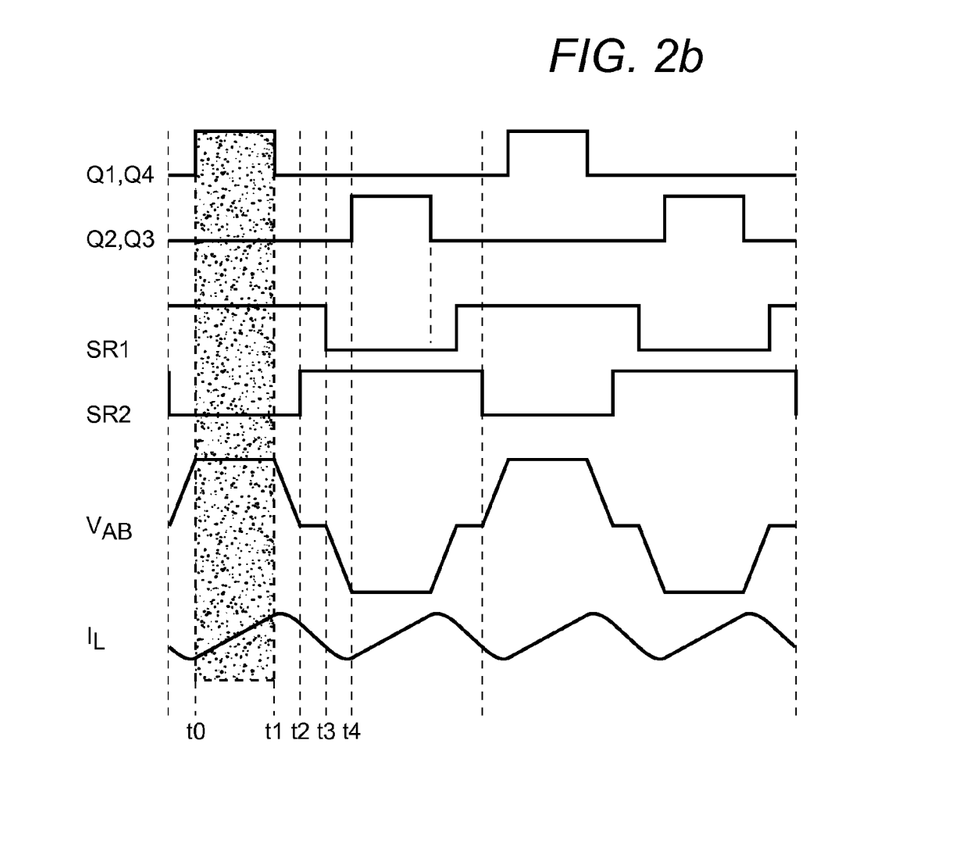
Figure 3A:
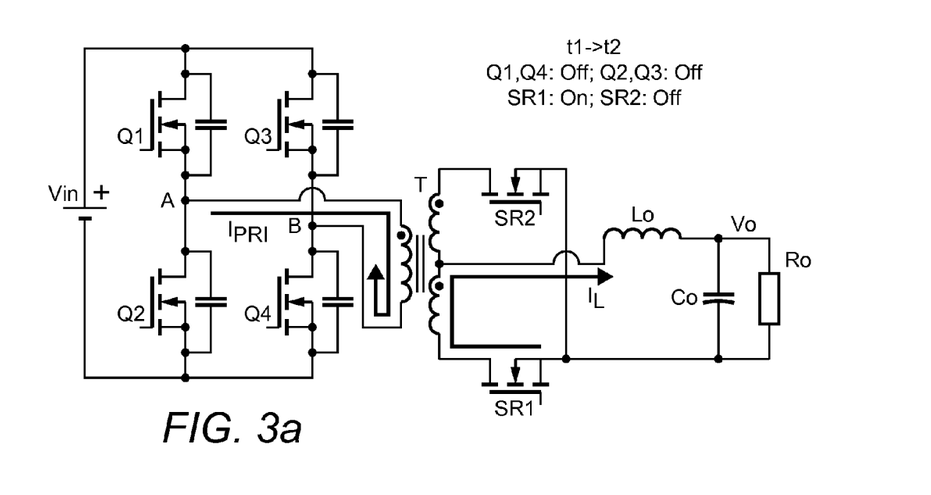
FIGS. 3a and 3b are schematic and timing diagrams, respectively, illustrating the operation of a full bridge power converter during a second time interval.
Figure 3B:
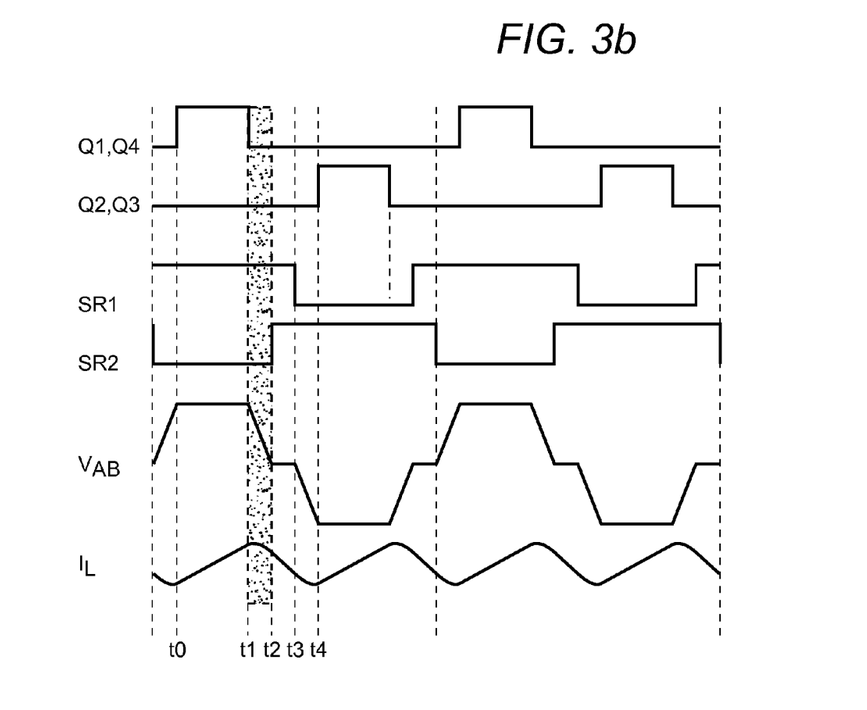
Figure 4A:
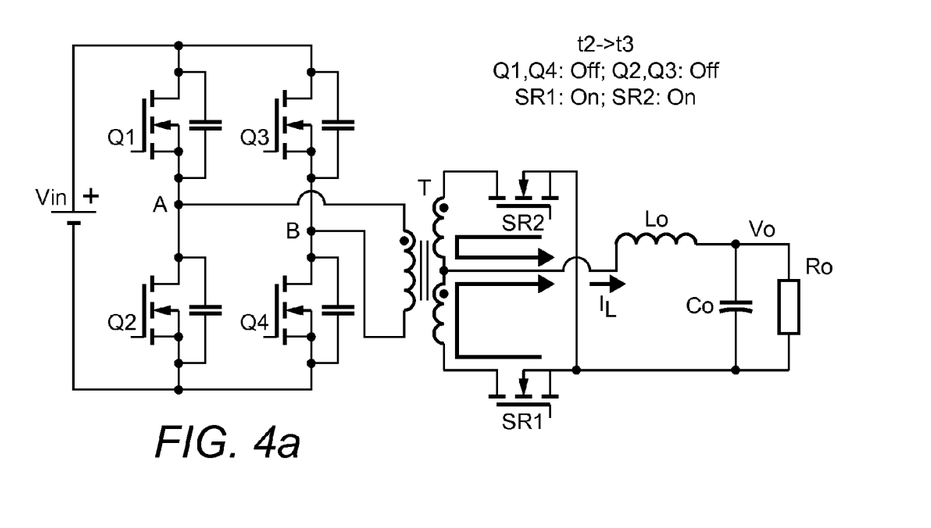
FIGS. 4a and 4b are schematic and timing diagrams, respectively, illustrating the operation of a full bridge power converter during a third time interval.
Figure 4B:
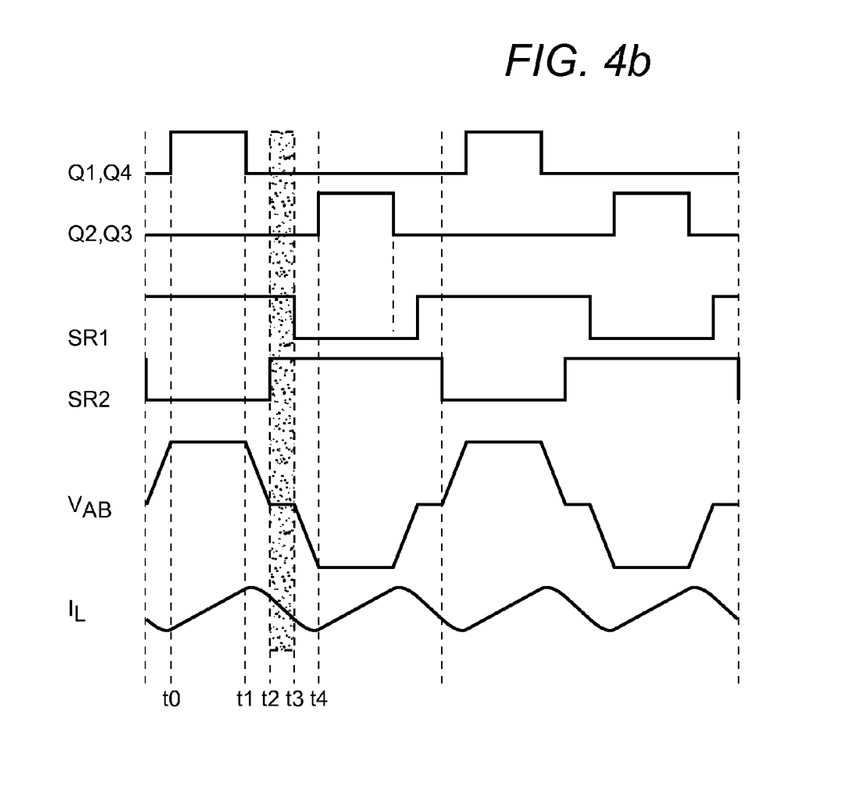

As shown in FIGS. 2a and 2b, during the time interval between t0 and t1 (denoted herein as "t0→t1"), bridge transistors Q1 and Q4 are on and Q2 and Q3 are off, which creates a positive voltage approximately equal to Vin between circuit nodes A and B (referred to as $V_{AB}$) and thus across the primary side of transformer T, and a corresponding current $I_{PRI}$ in the primary winding. Synchronous rectifier SR1 is also on during this interval (and SR2 is off), resulting in a current ($I_L$) with a positive slope in inductor Lo. During the time interval from t1→t2 (FIGS. 3a and 3b), bridge transistors Q1-Q4 are all off, while SR1 remains on. This results in $V_{AB}$ decreasing towards zero, at a rate affected by the inherent output capacitance of transistors Q1-Q4 (represented as capacitors connected across each transistor), as well as a decrease in inductor current $I_L$.

During the time interval from t2→t3 (FIGS. 4a and 4b), bridge transistors Q1-Q4 are still off, but here both SR1 and SR2 are on. Having both SR1 and SR2 on shorts the secondary winding of transformer T, which has the effect of also shorting the primary winding and thus forcing $V_{AB}$ to zero. Inductor current $I_L$ also continues to decrease. Then during the time interval from t3→t4 (FIGS. 5a and 5b), Q1-Q4 remain off and SR1 is off with SR2 on. This causes voltage $V_{AB}$ to begin decreasing towards −Vin (at a rate determined by the inherent output capacitance of transistors Q1-Q4); inductor current $I_L$ also continues to decrease the interval following t4, Q2 and Q3 turn on with SR1 off and SR2 on, such that $V_{AB}$ is approximately equal to −Vin and inductor current $I_L$ begins to increase in the same fashion as when Q1 and Q4 turned on during the t0→t1 interval. Note that when $V_{AB}$ increases, the rate at which it does so is also affected by the inherent output capacitance of transistors Q1-Q4. Also note that, though Q1-Q4 and SR1 and SR2 are shown as implemented with MOSFETs, other devices might also be used.

Figure 6A:
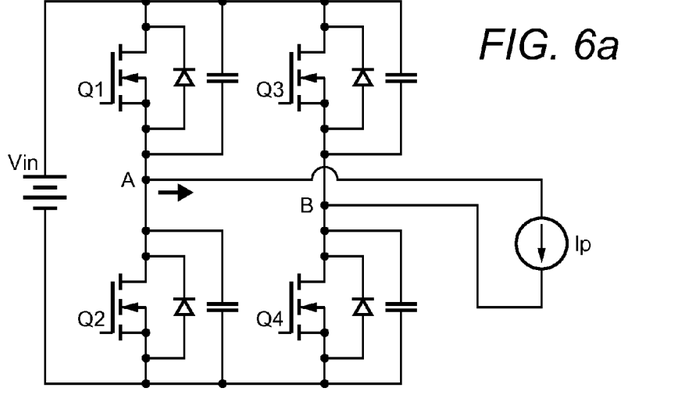
FIGS. 6a and 6b are schematic and timing diagrams, respectively, illustrating how the slope of voltage $V_{AB}$ varies with the magnitude of the load current.
Figure 6B:
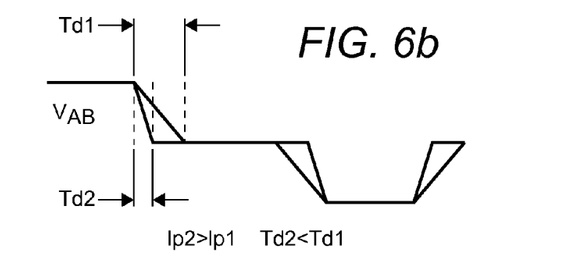

The magnitude of the load current also affects the rate at which voltage $V_{AB}$ increases and decreases. This is illustrated in FIGS. 6a and 6b. FIG. 6a depicts the current in the transformer's primary winding, here represented as a current Ip; Ip increases with load current. Voltage $V_{AB}$ is shown in FIG. 6b, for two conditions. When the magnitude of the load current is relatively low, the primary winding current (Ip1) is also relatively low and voltage $V_{AB}$ decreases at a relatively slow rate—with the time required for $V_{AB}$ to fully transition given by Td1. When the magnitude of the load current is relatively high, the primary winding current (Ip2) is also high, and voltage $V_{AB}$ decreases at a relatively fast rate defined by time Td2. Thus, when Ip2>Ip1, Td2<Td1. The relationship between transition time (Td) and primary winding current Ip is given by:

$$Td = \frac{\frac{Vin}{2} \times 4 \times \frac{2}{3} Coss}{Ip},$$

where Coss is the output capacitance of transistors Q1-Q4. Coss is multiplied by ⅔ to approximate the average capacitance value over a range of drain-to-voltages.

Figure 5A:
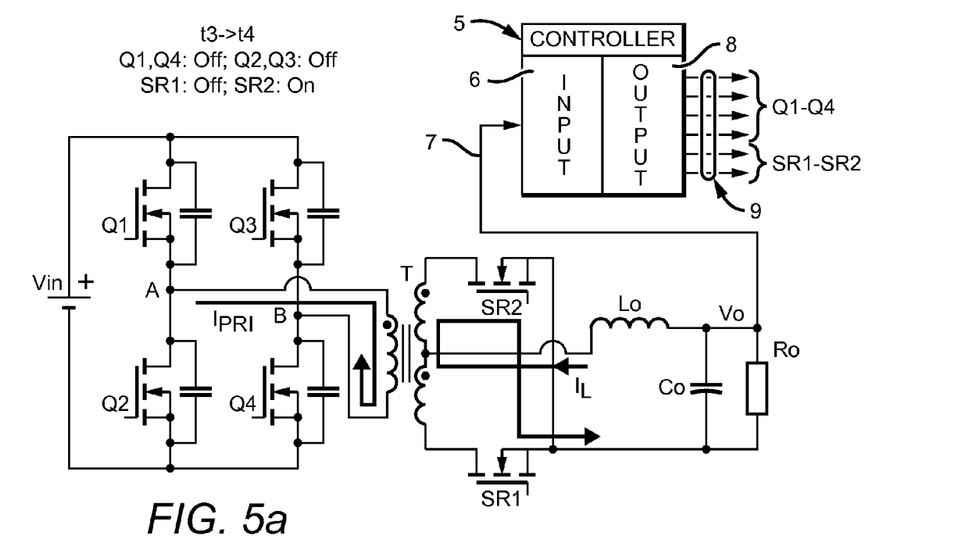
FIGS. 5a and 5b are schematic and timing diagrams, respectively, illustrating the operation of a full bridge power converter during a fourth time interval.
Figure 5B:
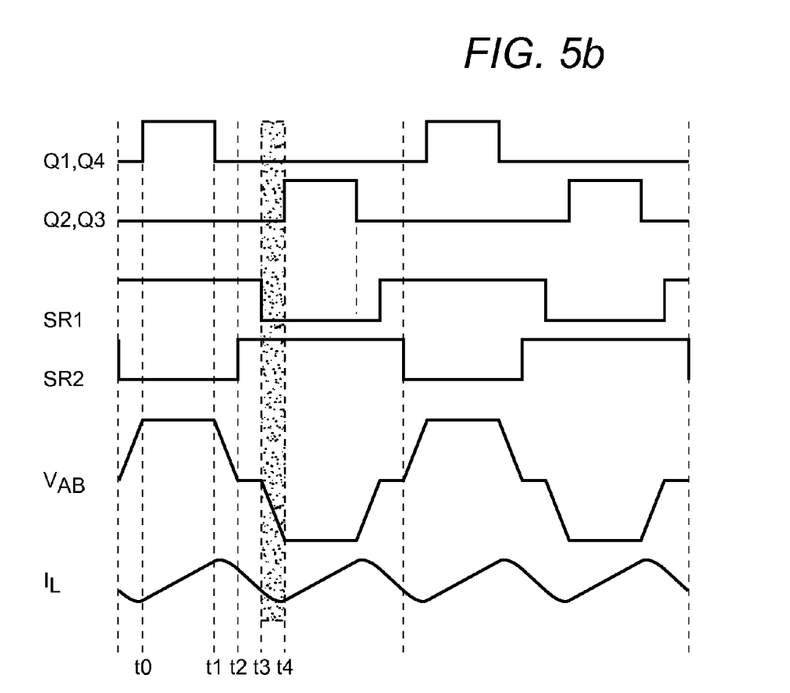

A controller is used to operate the switching elements of a full bridge power converter as described herein; an exemplary embodiment is shown in FIG. 5a. The controller 5 would typically include an input circuit 6 arranged to receive a signal 7 representative of the converter's output voltage, and an output circuit 8 arranged to provide signals 9—preferably PWM signals—which operate the switching elements (here, Q1-Q4) and the synchronous rectifiers (SR1, SR2) to produce a desired output voltage Vo. The controller also controls the converter's "dead time" (Tdt), defined above. Dead time Tdt has an effect on converter efficiency. For example, when the converter is driving a relatively large load, it will be most efficient when Tdt is set very short. Thus, the conventional approach with full bridge with SR power converters of this sort is to operate the converter with a fixed, short dead time.

Figure 7A:
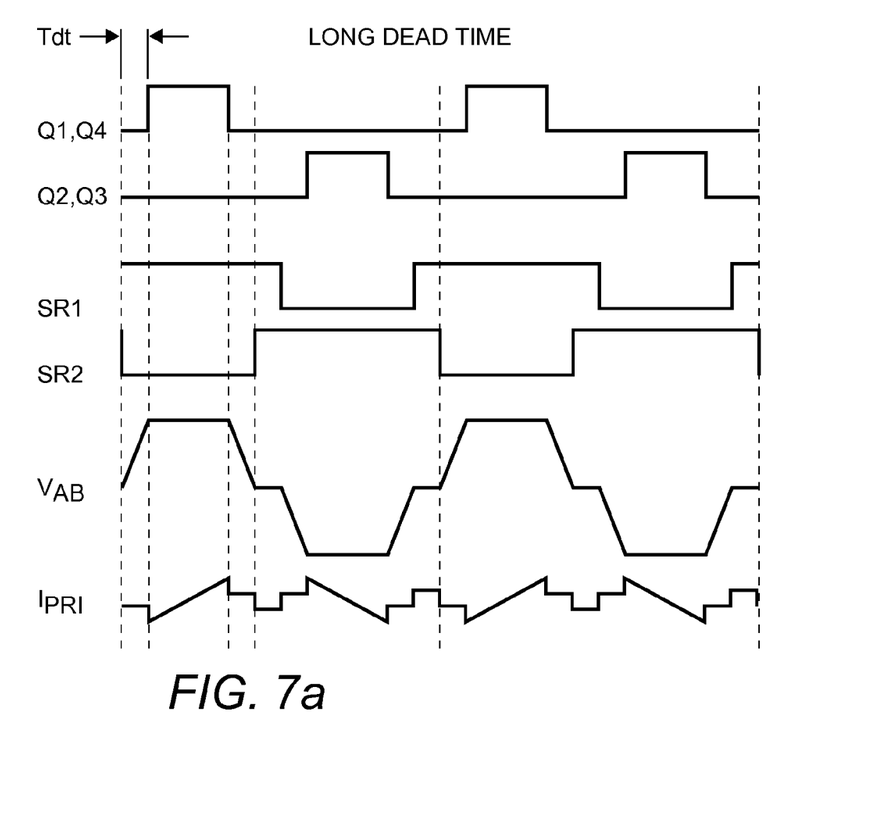
FIGS. 7a and 7b are timing diagrams illustrating the operation of a full bridge power converter having a long dead time vs. a short dead time, respectively.
Figure 7B:
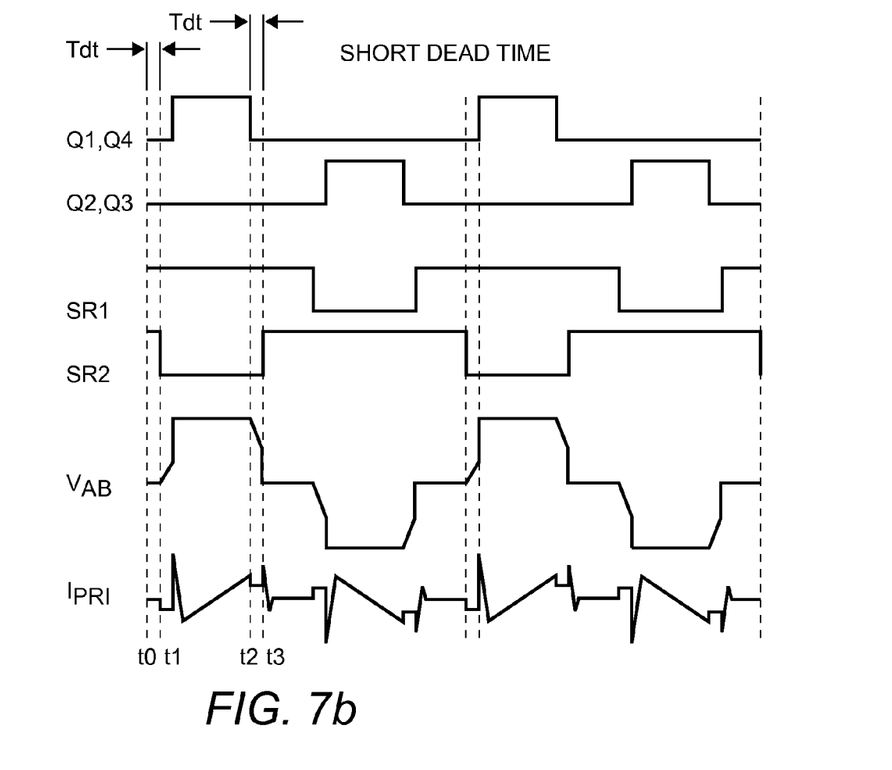

However, this short, fixed dead time approach can become a problem when the converter is driving a relatively light load; as shown in FIG. 6b, this causes voltage $V_{AB}$ to increase and decrease at a relatively slow rate. This can result in $V_{AB}$ being either undesirably shorted or forced to ±Vin. This is illustrated in FIGS. 7a and 7b. In FIG. 7a, dead time Tdt is to a relatively long period, such that $V_{AB}$ transitions normally. In FIG. 7b, however, Tdt is set a relatively short period. As a result, when $V_{AB}$ begins increasing at time t0, and Q1 and Q4 turned on at time t1, the short Tdt results in $V_{AB}$ being prematurely forced to ±Vin before it had time to complete its transition. Alternatively, when $V_{AB}$ begins decreasing at time t2, and SR2 is turned on at time t3, the short Tds results in $V_{AB}$ being shorted and thus prematurely forced to zero before it has had time to complete its transition. As shown in FIG. 7b at times and t3, either of these events induces a large current spike in the primary winding current $I_{PRI}$, thereby resulting in a power loss that would not occur except for the fact that Tdt is too short the light load condition.

The present control scheme overcomes this problem by having the converter's dead time be adaptively varied in an inverse relationship to the magnitude of the load current. Thus, a relatively large load results in a relatively short dead time, while a relatively light load condition results in a longer dead time. This is accomplished by modulating at least one of the rising or falling edges of at least one of the signals used to operate the synchronous rectifiers. Preferably, both the rising and falling edges of the signals used to operate each of the synchronous rectifiers are modulated, such that the converter's dead time is adaptively varied in a linear inverse relationship to the magnitude of the load current. Adjusting the converter's dead time in this way serves to reduce the possibility of the voltage across the primary side of the transformer being shorted or forced to ±Vin while in operation.

Figure 8A:
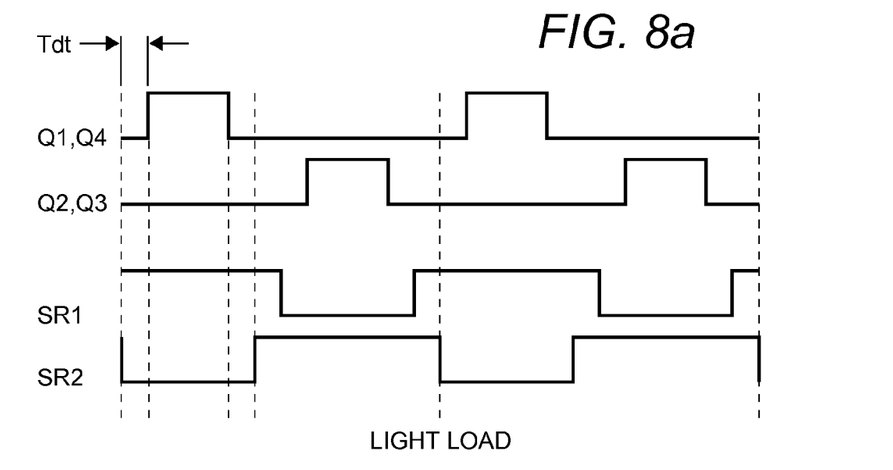
FIGS. 8a and 8b are timing diagrams illustrating the operation of a full bridge power converter under a light load vs. a heavy load, when employing an ADT control scheme as described herein.
Figure 8B:
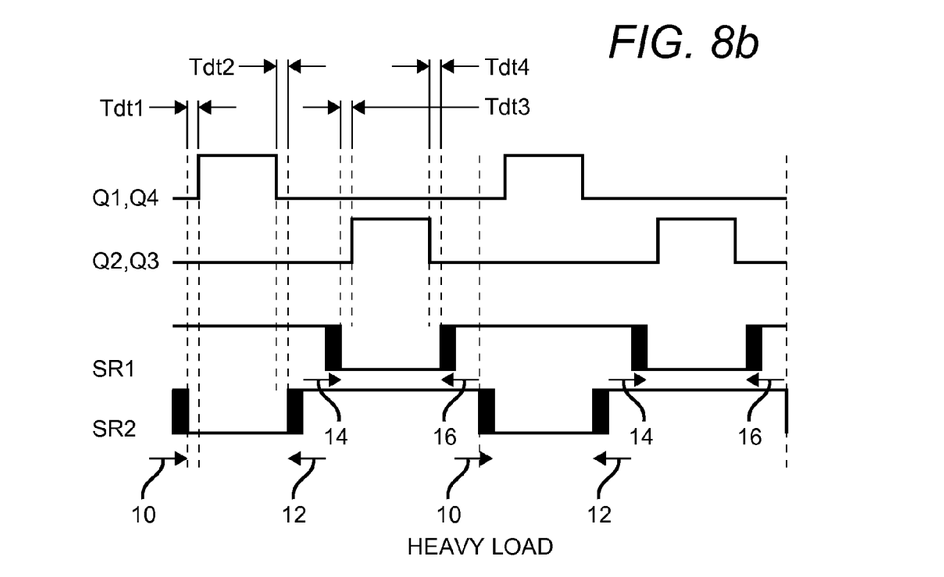

An illustration of the operation of the present control scheme is shown in FIGS. 8a and 8b. In FIG. 8a, the load being driven is relatively light. As such, the dead time Tdt (only one which is illustrated, though the dead times would typically be of similar duration) is set to be relatively long, thereby ensuring that voltage $V_{AB}$ can transition normally, without being prematurely forced to zero or ±Vin. In FIG. 8b, the load is heavy with respect to the light of FIG. 8a. As this results in a faster transition time for voltage $V_{AB}$, a shorter dead time can used, which provides better converter efficiency. This is accomplished by modulating at least one edge of one of the signals driving the synchronous rectifiers. In this example, which illustrates the preferred approach, both the rising and falling edges of the signals used to drive both SR1 and SR2 are modulated—this is referred to as "ADT with dual edge modulation". indicated by the small horizontal arrows in FIG. 8b, the falling edge of SR2 is moved closer the rising edge of the Q1,Q4 pulse (arrow 10), thereby shortening Tdt1. Similarly, the rising edge of SR2 is moved such that the dead time Tdt2 between it and the falling edge of the pulse is reduced (arrow 12). In the same fashion, the falling edge of SR1 is moved closer to rising edge of Q2,Q3 (arrow 14), and the rising edge of SR1 is moved closer to the falling of Q2, Q3 (arrow 16), to reduce those dead times (Tdt3, Tdt4). Each of the dead times (Tdt1-(Tdt1-Tdt4) are preferably adjusted by the same amount, though this is not essential; the control scheme might alternately be set up so that only selected dead times are adjusted, or so that different dead times are adjusted by different amounts.

Figure 8C:
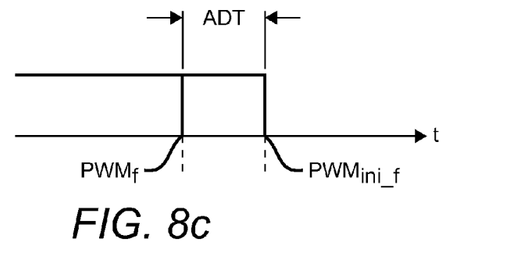
FIGS. 8c and 8d are diagrams illustrating the effect of the ADT control scheme on a falling edge and a rising edge, respectively.

As noted above, the signals used to operate the synchronous rectifiers are preferably PWM signals. In a preferred embodiment, the controller is arranged to adaptively vary the falling edge of at least one of the PWM signals used to operate the synchronous rectifiers such that the "adapted" falling edge $PWM_f$—i.e., the location of the falling edge after it has been adjusted in accordance with the present control scheme—is given by:

$$PWM_f = PWM_{ini\_f} - ADT,$$

where $PWM_{ini\_f}$ is the initial position of the falling edge (i.e., where the falling edge would be positioned with no adaptation), and ADT is the adaptive dead time, with $ADT = ADT_{max} - Io*k$, where $ADT_{max}$ is the maximum allowable ADT value, Io is the current conducted by the load, and k is a fixed value coefficient. The operation of this $PWM_f$ equation is shown in FIG. 8c, which illustrates how the PWM signal's falling edge occurs earlier than it would have in a system without the present ADT control scheme, by an amount of time determined by the ADT value.

Figure 8D:
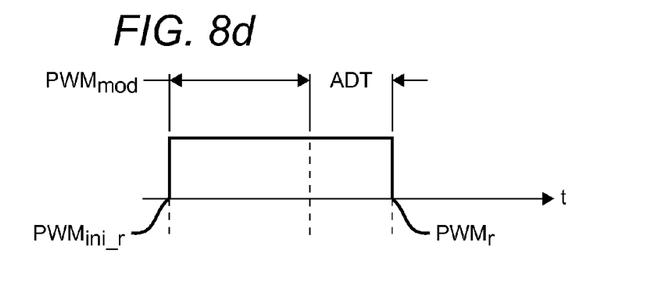

As an alternative, or in addition, to adjusting the falling edge of one or more of the PWM signals driving SR1 and/or SR2, the rising edge of one or more of the PWM signals driving SR1 and/or SR2 can also be adaptively varied. In a preferred embodiment, the controller is arranged to adaptively vary the rising edge of at least one of the PWM signals used to operate the synchronous rectifiers such that the "adapted" rising edge $PWM_r$—i.e., the location of the rising edge after it has been adjusted in accordance with the present control scheme—is given by:

$$PWM_r = PWM_{ini\_r} + PWM_{mod} + ADT,$$

where $PWM_{ini\_r}$ is the initial position of the rising edge (i.e., where the rising edge would be positioned with no adaptation), and ADT is as defined above, and $PWM_{mod}$ is a modulated pulse width which varies with the output voltage. In normal PWM operation, a first edge of each PWM pulse is in a fixed position, and the second edge moves with respect to the first to achieve regulation. The $PWM_{mod}$ value determines the nominal position of the moving this value might come from, for example, a PID filter within the converter's feedback control loop. Thus, $PWM_{mod}$ will vary with the output voltage. The operation of this $PWM_r$ equation shown in FIG. 8d, which illustrates how the PWM signal's rising edge occurs later than it would have in a system without the present ADT control scheme, by an amount of time determined by $PWM_{mod}$ and the ADT value.

$ADT_{max}$ is preferably larger than the normal $V_{AB}$ transition time at minimum load, which is determined by factors such as the output capacitance of the transistors and the output current at light load. Ideally, ADT is larger than nominal transition time Td—i.e., $ADT_{max} - Io*k > 4/3 * C_{oss} * Vin/Ip$.

A controller arranged to effect the present control scheme can be provided using methods well-known to those familiar with this field. In most cases, the controller would be implemented digitally, and would be arranged to provide the signals necessary to effect the converter's normal PWM regulation, as well as the ADT control scheme as described herein. The controller might reside in an integrated circuit separate from the circuitry making up the full bridge converter (e.g., the full bridge transistors, the transformer, the SRs, the output inductor and capacitor). Alternatively, the controller might be integrated or housed along with some or all of this converter circuitry. Implementing the ADT control scheme as described herein enables the full bridge power converter to operate at high efficiency under varying load conditions.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A controller for use with a switch mode power converter, the switch mode converter including a transformer, a full bridge circuit comprising a plurality of switching elements and coupled to a DC input voltage Vin at an input and to the primary side of said transformer at an output, and first and second synchronous rectifiers coupled between the secondary side of said transformer and an output circuit which includes an output inductor and is arranged to provide an output voltage to which a load may be coupled, said controller comprising:

an input circuit arranged to receive a signal representative of said output voltage; and
   an output circuit arranged to provide signals which operate said switching elements and said synchronous rectifiers to produce a desired output voltage, said controller arranged such that the converter's "dead time" is adaptively varied in an inverse relationship to the magnitude of said load;
   wherein said signals used to operate said synchronous rectifiers are pulse-width modulated (PWM) signals;
   wherein said controller is arranged to adaptively vary said dead time by modulating at least one of the rising or falling edges of at least one of the PWM signals used to operate said synchronous rectifiers such that an adaptively varied rising or falling edge is determined using an initial edge position adjusted by an adaptive dead time (ADT) and adjusted using information about said output voltage; and
   wherein the adaptive dead time (ADT) is determined using information about a current conducted by said load.

2. The controller of claim 1 wherein said controller is arranged to adaptively vary said dead time by modulating the rising and falling edges of the signals used to operate said first and second synchronous rectifiers.

3. The controller of claim 1 wherein said converter's "dead time" is adaptively varied in a linear inverse relationship to the magnitude of said load.

4. The controller of claim 1, wherein said controller is arranged to adaptively vary the falling edge of at least one of the PWM signals used to operate said synchronous rectifiers such that the adapted falling edge $PWM_f$ is given by:

$$PWM_f = PWM_{ini\_f} - ADT,$$

where $PWM_{ini\_f}$ is an initial position of said falling edge with no adaptation and with $ADT = ADT_{max} - I_o*k$, where $ADT_{max}$ is the maximum allowable ADT value, $I_o$ is the current conducted by said load, and k is a fixed value coefficient.

5. The controller of claim 1, wherein said controller is arranged to adaptively vary the rising edge of at least one of the signals used to operate said synchronous rectifiers such that the adapted rising edge $PWM_r$ is given by:

$$PWM_r = PWM_{ini\_r} + PWM_{mod} + ADT,$$

where $PWM_{ini\_r}$ is an initial position of said rising edge with no adaptation, $PWM_{mod}$ is a value which varies with said output voltage, and with $ADT = ADT_{max} - I_o * k$, where $ADT_{max}$ is the maximum allowable ADT value, $I_o$ is the current conducted by said load, and k is a fixed value coefficient.

6. The controller of claim 1, further comprising a switch mode power converter, comprising:
   a transformer;
   a full bridge circuit comprising a plurality of switching elements and coupled to Vin at an input and to the primary side of said transformer at an output;
   first and second synchronous rectifiers; and
   an output circuit which includes an output inductor and is arranged to provide said output voltage, said first and second synchronous rectifiers coupled between the secondary side of said transformer and said output circuit.

7. The controller of claim 6, wherein said full bridge circuit comprises first, second, third and fourth transistors connected in a full bridge configuration, the input side of said full bridge circuit connected across Vin and the output side of said full bridge circuit connected across the primary side of said transformer.

8. The controller of claim 7, wherein said controller is arranged such that the converter's "dead time" is adaptively varied so as to inhibit or reduce the possibility of the voltage across the primary side of said transformer being shorted or forced to ±Vin while in operation.

9. The controller of claim 6, wherein said first synchronous rectifier is connected between one side of said transformer's secondary winding and a first node and said second synchronous rectifier is connected between the other side of said transformer's secondary winding and said first node.

10. The controller of claim 9, wherein said output circuit comprises: said output inductor, connected between a tap on said transformer's secondary winding and an output node at which said output voltage is provided; and an output capacitor connected between said output node and said first node; said load connected between said output node and said first node.

11. The controller of claim 1, wherein said controller is arranged such that said switch mode power converter operates in continuous conduction mode (CCM).

12. A full bridge switch mode power converter, comprising:
   a transformer;
   a full bridge circuit comprising a plurality of switching elements and coupled to a DC input voltage Vin at an input and to the primary side of said transformer at an output;
   a first synchronous rectifier connected between one side of said transformer's secondary winding and a first node; a second synchronous rectifier connected between the other side of said transformer's secondary winding and said first node;
   an output inductor connected between a tap on said transformer's secondary winding and an output node at which said output voltage is provided and to which a load may be coupled;
   an output capacitor connected between said output node and said first node; and
   a controller, comprising: an input circuit arranged to receive a signal representative of said output voltage; and an output circuit arranged to provide signals which operate said switching elements and said synchronous rectifiers to produce a desired output voltage, said controller arranged such that the converter's "dead time" is adaptively varied in an inverse relationship to the magnitude of said load;
   wherein said signals used to operate said synchronous rectifiers are pulse-width modulated (PWM) signals;
   wherein said controller is arranged to adaptively vary said dead time by modulating at least one of the rising or falling edges of at least one of the PWM signals used to operate said synchronous rectifiers such that an adaptively varied rising or falling edge is determined using an initial edge position adjusted by an adaptive dead time (ADT) and adjusted using information about said output voltage; and
   wherein the adaptive dead time (ADT) is determined using information about a current conducted by said load.

13. The power converter of claim 12, wherein said controller is arranged to adaptively vary said dead time by modulating the rising and falling edges of the PWM signals used to operate said first and second synchronous rectifiers.

14. The power converter of claim 13, wherein said controller is arranged to adaptively vary the falling edge of at least one of the PWM signals used to operate said synchronous rectifiers such that the adapted falling edge $PWM_f$ is given by:

$$PWM_f = PWM_{ini\_f} - ADT,$$

and to adaptively vary the rising edge of at least one of the signals used to operate said synchronous rectifiers such that the adapted rising edge $PWM_r$ is given by:

$$PWM_r = PWM_{ini\_r} + PWM_{mod} + ADT,$$

where $PWM_{ini\_f}$ is an initial position of said falling edge with no adaptation, $PWM_{ini\_r}$ is an initial position of said rising edge with no adaptation, with $ADT = ADT_{max} - I_o * k$ and $ADT_{max}$ is the maximum allowable ADT value, $I_o$ is the current conducted by said load, k is a fixed value coefficient, and $PWM_{mod}$ is a value which varies said output voltage.

15. A method of controlling the operation of a switch mode power converter including a transformer, a full bridge circuit comprising a plurality of switching elements and coupled to a DC input voltage Vin at an input and to the primary side of said transformer at output, and first and second synchronous rectifiers coupled between the secondary side of transformer and an output circuit which includes an output inductor and is arranged to provide an output voltage to which a load may be coupled, the method comprising:
   receiving a signal representative of said output voltage;
   operating said switching elements and said synchronous rectifiers to produce a desired output voltage; and
   adaptively varying the converter's "dead time" in an inverse relationship to the magnitude of said load;
   wherein said synchronous rectifiers are operating using pulse-width modulated (PWM) signals;
   wherein adaptively varying said dead time includes modulating at least one of the rising or falling edges of at least one of the PWM signals used to operate said synchronous rectifiers such that an adaptively varied rising or falling edge is determined using an edge position adjusted by an adaptive dead time (ADT) and adjusted using information about said output voltage; and wherein the adaptive dead time (ADT) is determined using information about a current conducted by said load.

16. The method of claim 15, wherein said adaptively varying said dead time comprises modulating the rising and falling edges of the signals used to operate said first and second synchronous rectifiers.

17. The method of claim 15, wherein adaptively varying said dead time includes adaptively varying the falling edge of at least one of the PWM signals used to operate said synchronous rectifiers such that the adapted falling edge $PWM_f$ is given by:

$$PWM_f = PWM_{offset} - ADT,$$

where $PWM_{offset}$ is the position of said falling edge with no adaptation and ADT is the adaptive dead time, with $ADT_{max} - I_o*k$ and $ADT_{max}$, where $ADT_{max}$ is the maximum allowable ADT value, $I_o$ is the current conducted by said load, and k is a fixed value coefficient.

18. The method of claim 15, wherein adaptively varying said dead time includes adaptively varying the rising edge of at least one of the signals used to operate said synchronous rectifiers such that the adapted rising edge $PWM_r$ is given by:

$$PWM_r = PWM_{offset} + PWM_{mod} + ADT,$$

where $PWM_{offset}$ is the position of said rising edge with no adaptation, $PWM_{mod}$ is a value which varies said output voltage, and ADT is the adaptive dead time, with $ADT = ADT_{max} - I_o*k$, where $ADT_{max}$ is the maximum allowable ADT value, $I_o$ is the current conducted by said load, and k is a fixed value coefficient.

19. The method of claim 15, wherein said converter's "dead time" is adaptively varied so as to inhibit or reduce the possibility of the voltage across the primary side of said transformer being shorted or forced to ±Vin while in operation.

20. The method of claim 15, wherein said switching elements and said synchronous rectifiers are operated such that said switch mode power converter operates in continuous conduction mode (CCM).

\* \* \* \* \*